United States Patent
Van Houten, II

(10) Patent No.: US 10,780,829 B2
(45) Date of Patent: Sep. 22, 2020

(54) VEHICLE SIDE MIRRORS

(71) Applicant: Richard David Van Houten, II, Anaheim, CA (US)

(72) Inventor: Richard David Van Houten, II, Anaheim, CA (US)

( * ) Notice: Subject to any disclaimer, the term of this patent is extended or adjusted under 35 U.S.C. 154(b) by 82 days.

(21) Appl. No.: 16/167,639

(22) Filed: Oct. 23, 2018

(65) Prior Publication Data
US 2019/0143900 A1  May 16, 2019

Related U.S. Application Data

(60) Provisional application No. 62/585,549, filed on Nov. 14, 2017.

(51) Int. Cl.
   *B60R 1/07* (2006.01)
   *B60R 1/00* (2006.01)
   *B60R 1/074* (2006.01)

(52) U.S. Cl.
   CPC ............. *B60R 1/07* (2013.01); *B60R 1/006* (2013.01); *B60R 1/074* (2013.01)

(58) Field of Classification Search
   CPC ................................ B60R 1/072; B60R 1/074
   See application file for complete search history.

(56) References Cited

U.S. PATENT DOCUMENTS

| | | | |
|---|---|---|---|
| 2,149,597 A | 3/1939 | Girl | |
| 4,893,916 A | 1/1990 | Sakuma | |
| 4,911,545 A * | 3/1990 | Miller | B60R 1/078 359/841 |
| 7,455,414 B2 | 11/2008 | Duroux | |
| 8,657,249 B2 | 2/2014 | Courbon | |
| 9,022,587 B2 | 5/2015 | Toyama | |
| 9,057,833 B2 | 6/2015 | Bowers | |
| 9,150,156 B2 | 10/2015 | Bowers | |
| 10,017,120 B1 | 7/2018 | Brown | |
| 2003/0117729 A1* | 6/2003 | Foote | B60R 1/072 359/841 |
| 2004/0057139 A1* | 3/2004 | Shinohara | B60R 1/06 359/877 |
| 2004/0120059 A1* | 6/2004 | Motomiya | B60R 1/072 359/877 |
| 2010/0140983 A1* | 6/2010 | Huelke | B60R 13/07 296/213 |

* cited by examiner

*Primary Examiner* — Charlie Y Peng

(57) ABSTRACT

A vehicle side mirror (22) housing (12) base (17) and mirror (23) to view behind you.
A vehicle side mirror (22) is concealed and revealed through an opening in the vehicle body (11) automatically when started, turned off, in park, in autonomous mode or manually with a switch, key fob or voice command.
When concealed in the container (16) the vehicle allows for more room to pass and less damage to the un-exposed vehicle side mirror (22), when driving or in autonomous mode the vehicle side mirror (22) is concealed thus the vehicle can have an increase in fuel economy do to the decrease of the drag coefficient.

1 Claim, 6 Drawing Sheets

VEHICLE SIDE MIRRORS

BACKGROUND

Field of Invention

This invention relates to mirrors and more particularly vehicle side mirrors and housings for viewing behind you.

Description of Prior Art

Vehicle side mirrors and housings have been designed to attach to an outer upper front portion, with the base in a fixed position and see behind you. Some vehicle side mirrors and housings have been designed to fold inward, either manually or mechanically or telescope outward. Examples of such vehicle designs are described in these U.S. Pat. Nos. 7,455,414; 10,017,120; 8,657,249; 2,149,597; 4,893,916; 9,150,156; 9,057,833; 9,022,587.

Respectively, they describe means for viewing behind you and or folding vehicle side mirror housings inward that are attached to the outer portion. A major drawback for the proposed designs is they are attached to the outer portion with the base in a fixed position and when you have limited space the vehicle side mirror and housings are still visible and therefore get damaged, broken or block access to pass or generally get in the way, furthermore when driving, the vehicle side mirror housings cause drag coefficient and reduce fuel economy.

Objects and Advantages

In general, the object of this invention is that of a vehicle side mirror, housing and assemblies that can be concealed and revealed through an opening in the vehicle body in various locations thus adding more room for access to pass and savings from damage being exposed and when in autonomous mode can decrease the drag coefficient and increase fuel economy.

Figure 1:
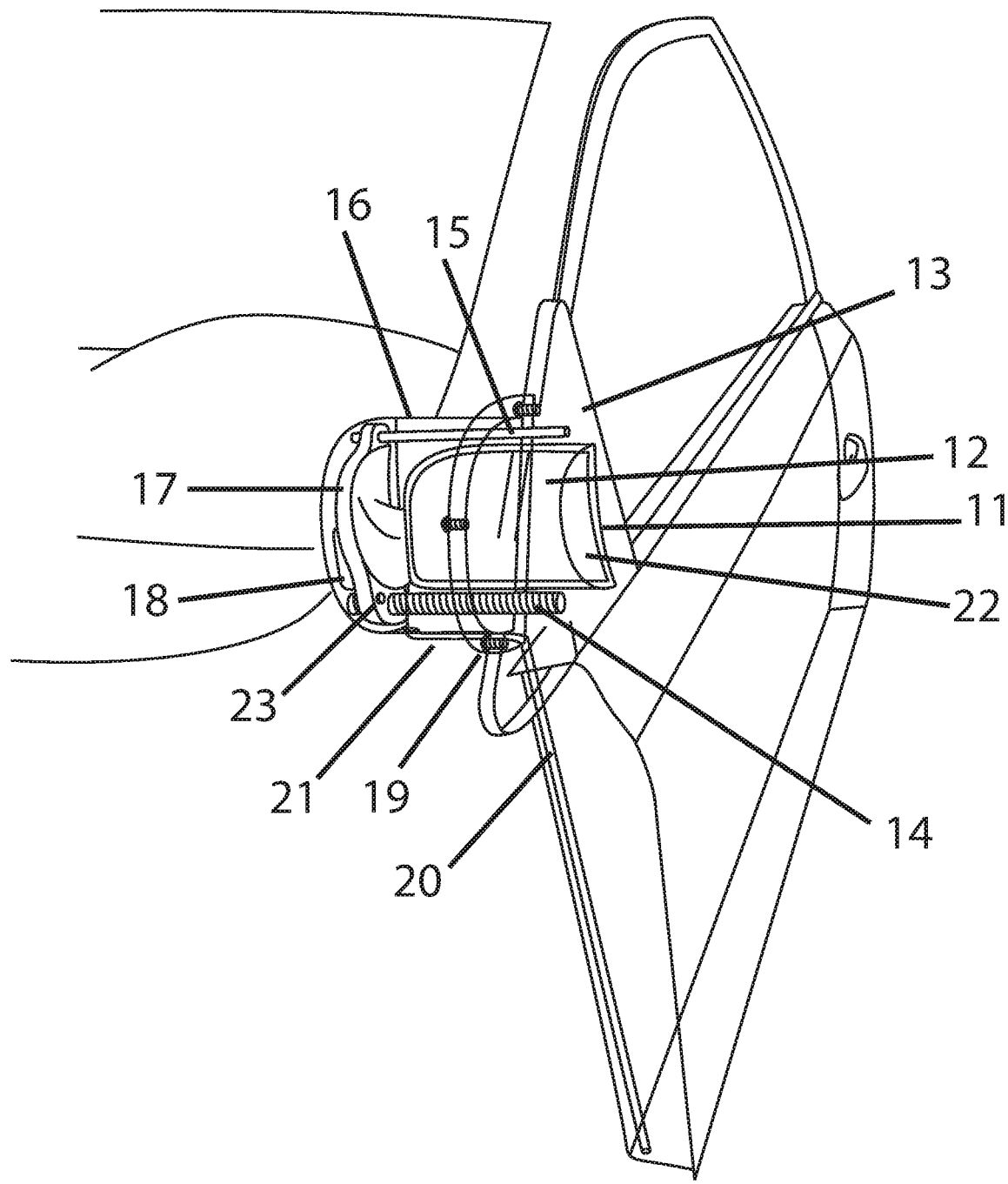
FIG. 1 is a front ¾ cutaway view of a vehicle side mirror and housing
Figure 2:
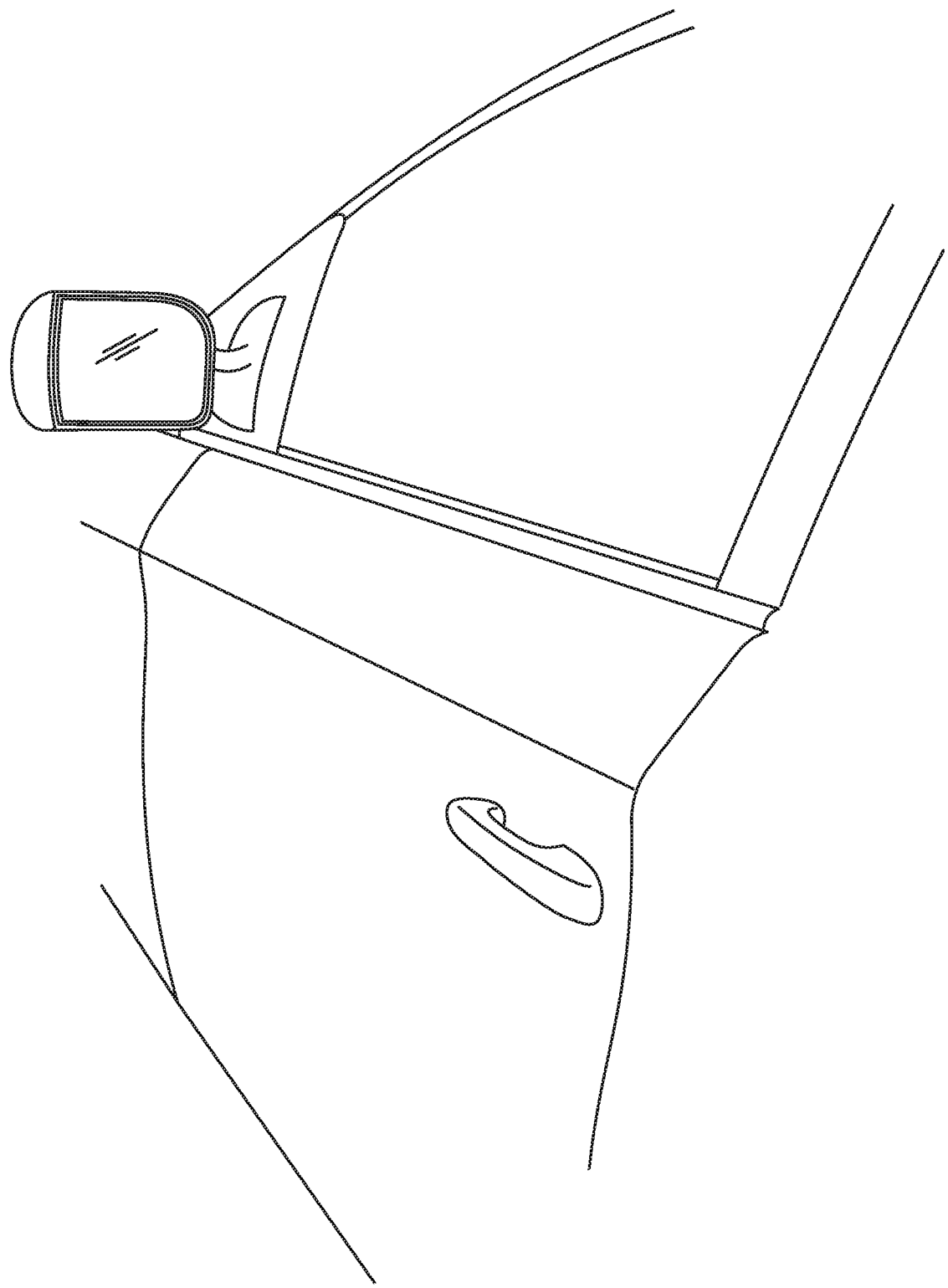
FIG. 2 is a rear ¾ view of a vehicle side mirror and housing
Figure 3:
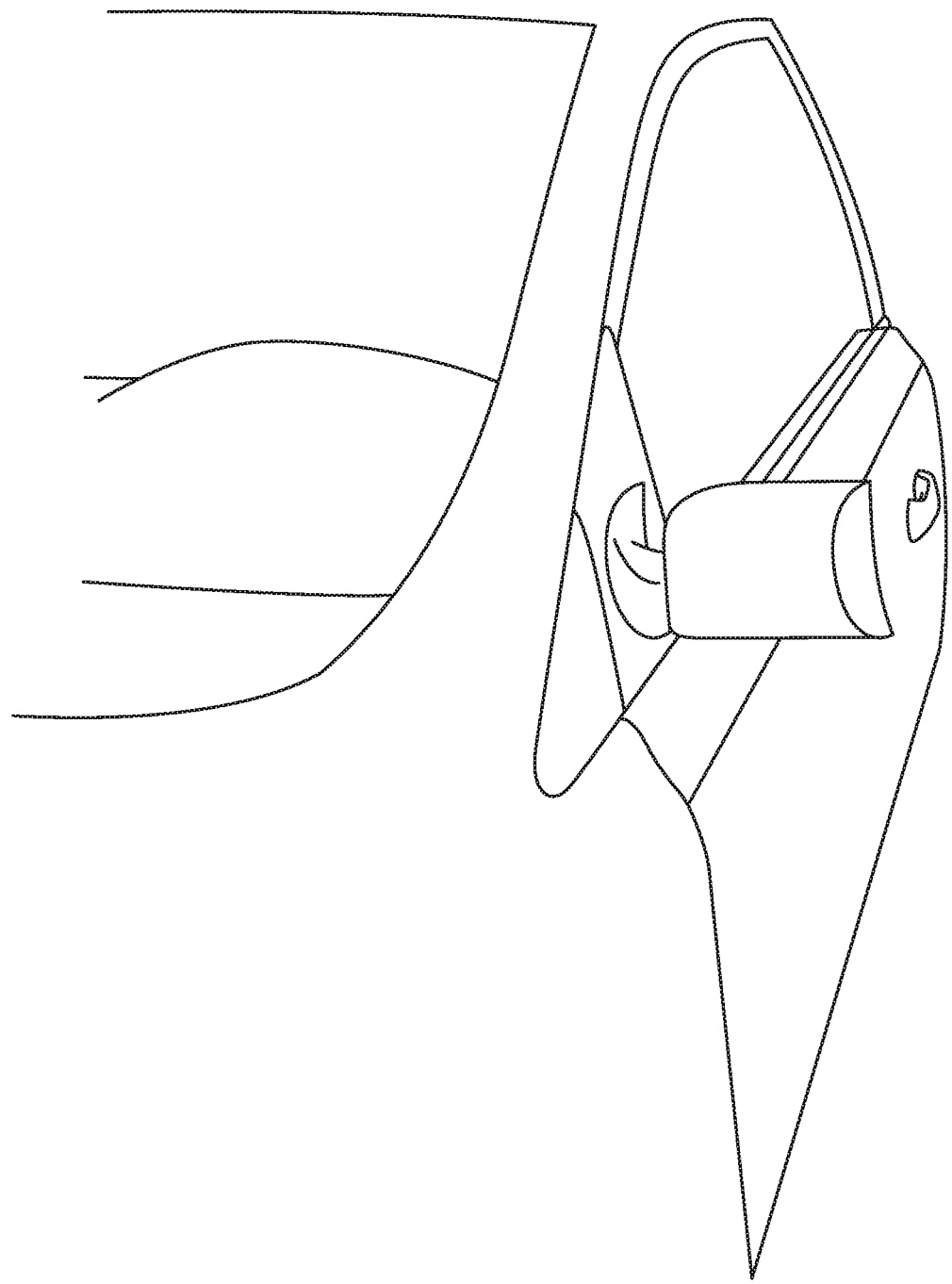
FIG. 3 is a front ¾ view of a vehicle side mirror and housing
Figure 4:
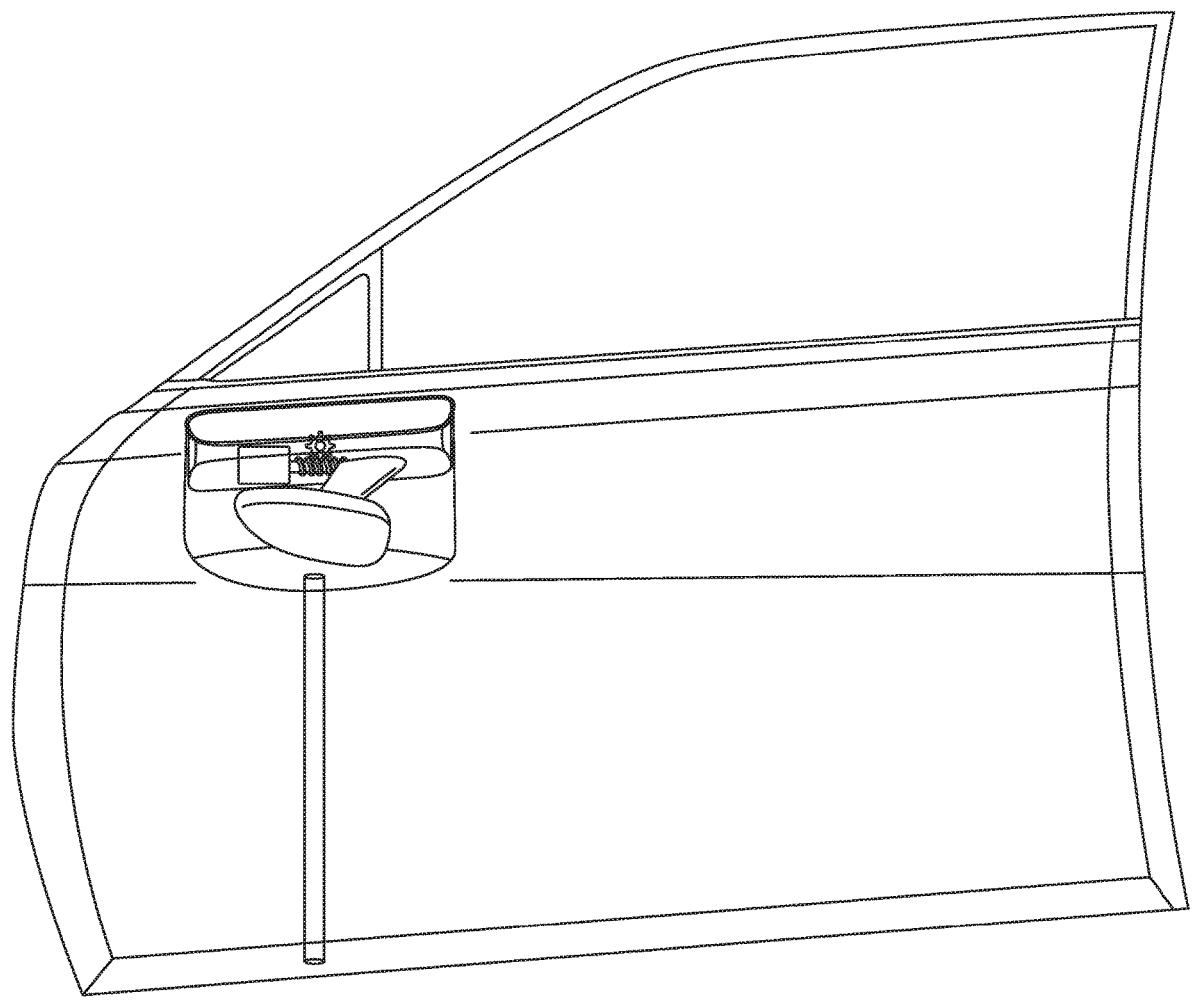
FIG. 4 is a side cutaway view of modified vehicle side mirror and housing
Figure 5:
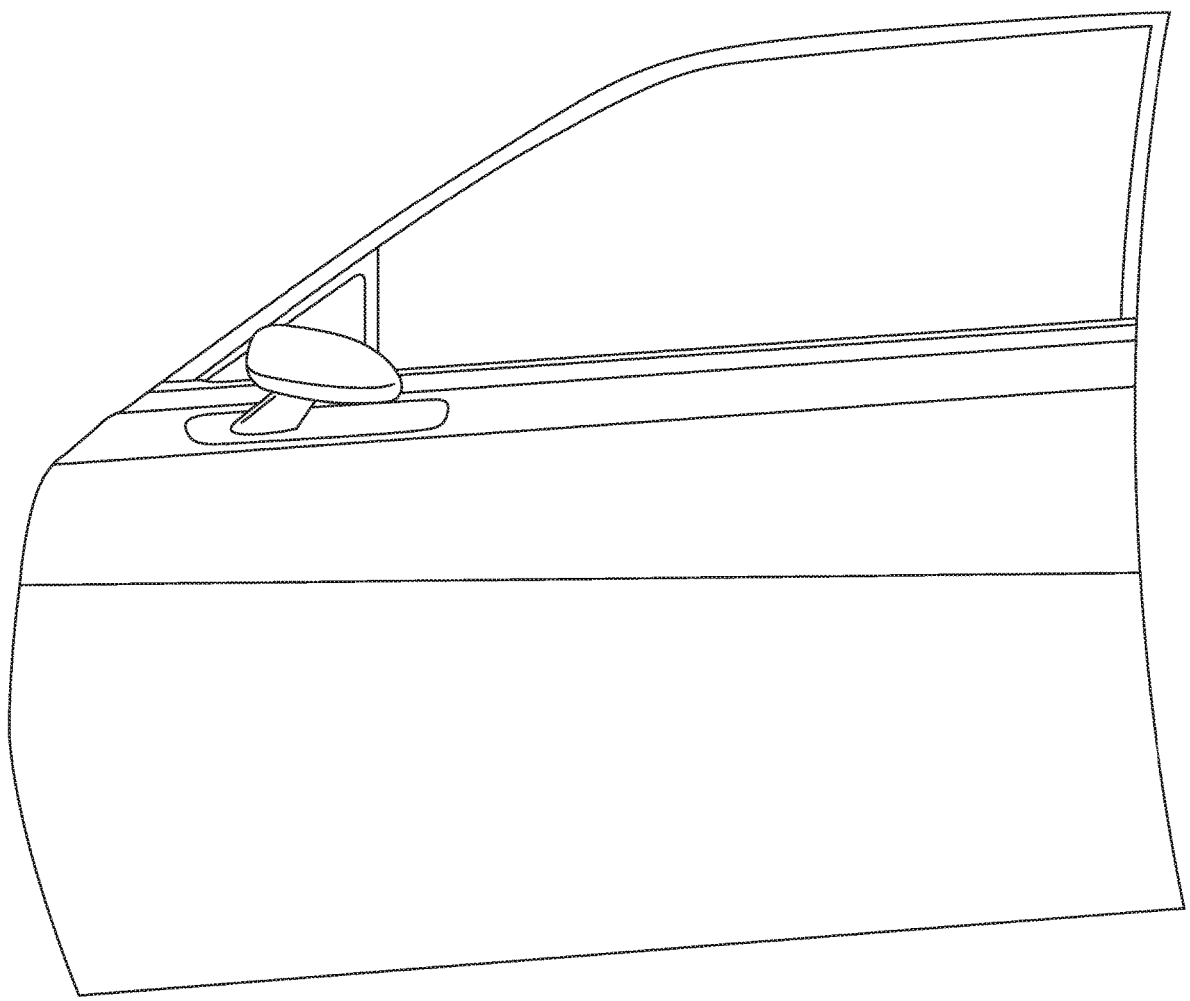
FIG. 5 is a side view of a modified vehicle side mirror and housing
Figure 6:
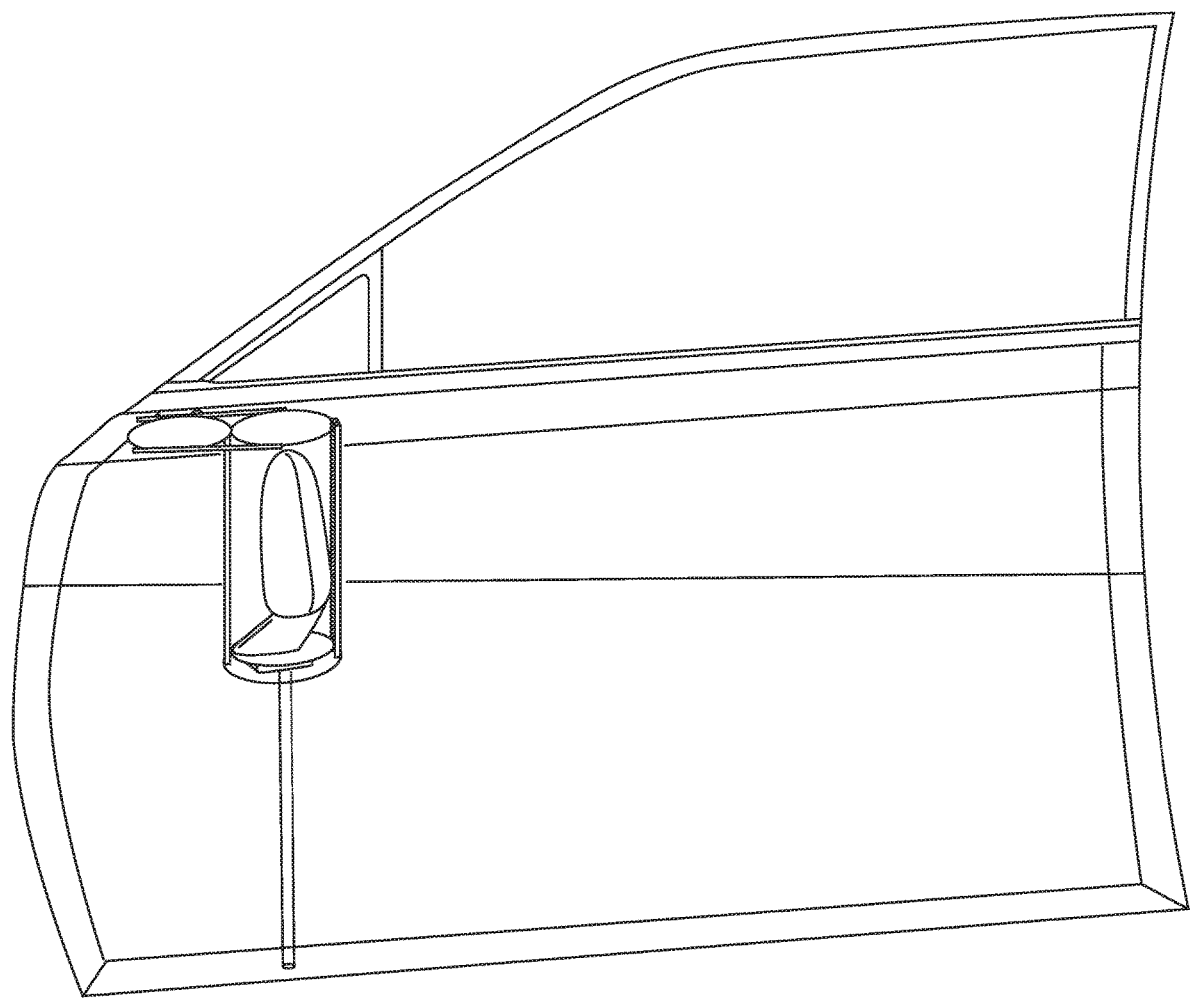
FIG. 6 is a side cutaway view of another modified vehicle side mirror and housing

| Reference Numerals in Drawings | |
| --- | --- |
| 11 opening in the vehicle body | 12 mirror housing |
| 13 vehicle outer body | 14 screw gear |
| 15 guide | 16 container |
| 17 housing base | 18 motor |
| 19 machine screw | 20 drain tube |
| 21 vehicle side mirror | 22 mirror |
| 23 stop sensor | |

SUMMARY OF THE INVENTION

Among the many objectives of this invention is the provision of a vehicle side mirror and housing.

A further objective of this invention is a vehicle side mirror and housing that can be concealed and revealed in various locations inside the outer body.

Yet a further objective of this invention is the concealment of a vehicle side mirror and housing to decrease damage to said vehicle side mirror and housing.

A still further objective of this invention is the concealment of the vehicle side mirror and housing to allow for more access to pass.

Another objective of this invention is the provision of increased fuel economy when the vehicle side mirror and housing are in the concealed position.

These and other objectives of the invention (which other objectives become clear by consideration of the specifications, claims and drawings as a whole) are met by providing a vehicle side mirror and housing that can be concealed and revealed through an opening in the vehicle body.

DESCRIPTION OF THE PREFERRED EMBODIMENT

With a vehicle side mirror of this invention, a three-dimensional housing can support a mirror and moveable assemblies to view behind you that can be concealed and revealed using many combinations of motors, mechanisms, electronics, robotics, hydraulics, gears, pulleys, cables, screws, guides and other means known and unknown. The housing portion of the vehicle side mirror are adapted to work together with the vehicle to conceal and reveal said housing mirror and assemblies.

One preferred method of the said vehicle side mirror is the use of a screw gear along with motors and other robotics to move the said mirror, housing and assemblies in and out of concealment.

Another preferred method of the said vehicle side mirror is the use of a worm screw and worm wheel along with motors and other robotics to rotate the said vehicle side mirror, housing and assemblies in and out of concealment.

Yet another preferred method of the said vehicle side mirror is the use of rack and pinion gears along with motors and other robotics to move the said mirror, housing and assemblies in and out of concealment.

Clearly the three-dimensional housing can be colored appropriately. Furthermore, the three-dimensional housing and mirror can be in a multitude of shapes and sizes to interact with the vehicle to conceal and reveal thus providing great flexibility in the vehicle side mirror use or permit a variety of applications.

These vehicle side mirrors can be formed from any suitable material: glass, plastics, resins, carbon fiber, metals or combinations thereof.

Referring now to FIG. 1, a vehicle side mirror 22 has a mirror housing 12 that contains a mirror 23. The housing base 17 and other mirror components travels in and out of the vehicle outer body 13 through an opening in the vehicle body 11 with the use of a motor 18 a screw gear 14 and a guide 15. The screw gear 14 and guide 15 are attached to an inner portion of the outer body 13 allowing the housing base 17 to move in and out of the vehicle outer body 13 through an opening in the vehicle body 11 when the vehicle side mirror goes out there is a stop sensor 23 that is activated and the mirror stops advancing and the housing base 17 seals against the opening in vehicle body 11, when the vehicle side mirror comes in to the concealed position the outer mirror housing 12 seals against the opening in vehicle body 11. A container 16 is attached using machine screws 19 to an inner portion of the vehicle outer body 13. The container 16 has a drain tube 20 for the release of any water from snow, rain, car wash or any other situation where water may occur.

The vehicle side mirror 22 may have electrical wiring (not shown), vacuum lines (not shown), pneumatics (not shown), also many features such as a manual override switch that can be activated manually by an interior switch, key fob or by voice command to conceal or reveal the vehicle side mirror at any time (not shown) reflectors (not shown), cameras (not shown), turn signals (not shown), telescoping housing (not shown), lights (not shown), blind spot sensors (not shown), mirror angle adjustment components (not shown), dimming mirrors, (not shown), heaters (not shown). Accordingly, all such modifications and variations are intended to be included within the scope of this invention as defined in the following claims.

I claim:

1. A vehicle side mirror system comprising:

a mirror and a housing with a base;

wherein the mirror housing and the base are one or more components;

wherein the housing with the base contains a mirror and robotics for adjusting the mirror, the housing, and the base;

an opening on the vehicle body for the mirror, the housing, and the base to go through and into the vehicle body;

a motor or motors, gears, guides, electronics, and the robotics to move the mirror, housing, and base into the body;

wherein the mirror and the housing with the base move into a container that is inside the vehicle body, for containing and concealing the mirror and the housing with the base;

wherein the container is monolithic, or of multiple pieces and different materials;

wherein the container has a drain system for incidental water to escape the vehicle;

wherein the mirror and the housing with the base are automatically revealed or concealed through the opening of the vehicle body when the vehicle is started, turned off, in park, or in autonomous mode;

and wherein the mirror and the housing with the base is revealed or concealed through the opening of the vehicle body manually with a switch, voice command or other means at any given time.

* * * * *